(12) United States Patent
Garoffolo

(10) Patent No.: US 7,469,806 B2
(45) Date of Patent: Dec. 30, 2008

(54) BICYCLE CARRIER APPARATUS FOR AUTOMOBILE

(76) Inventor: Gregory L. Garoffolo, 298 Greens Farm Rd., Westport, CT (US) 06880

( * ) Notice: Subject to any disclaimer, the term of this patent is extended or adjusted under 35 U.S.C. 154(b) by 496 days.

(21) Appl. No.: 11/236,981

(22) Filed: Sep. 28, 2005

(65) Prior Publication Data

US 2007/0102464 A1   May 10, 2007

(51) Int. Cl.
*B60R 9/10* (2006.01)
(52) U.S. Cl. ............... 224/310; 224/502; 224/519; 224/924
(58) Field of Classification Search ............... 224/310, 224/492, 495, 502, 504–507, 924, 519, 521; *B60R 9/10, B60R 9/08*
See application file for complete search history.

(56) References Cited

U.S. PATENT DOCUMENTS

| | | | | |
|---|---|---|---|---|
| 2,492,841 | A | * 12/1949 | Burkey | ............ 414/462 |
| 3,809,266 | A | 5/1974 | Salerni | |
| 4,269,561 | A | * 5/1981 | Rutten | ............ 414/462 |
| 5,518,156 | A | 5/1996 | Lehman | |
| 5,685,686 | A | * 11/1997 | Burns | ............ 414/462 |
| 5,884,826 | A | * 3/1999 | Shaver | ............ 224/509 |
| 5,996,870 | A | * 12/1999 | Shaver | ............ 224/532 |
| 6,092,706 | A | * 7/2000 | Bogan | ............ 224/401 |
| 6,123,498 | A | * 9/2000 | Surkin | ............ 414/462 |
| 6,189,748 | B1 | 2/2001 | Hutter | |
| 6,234,372 | B1 | 5/2001 | Rivera | |
| 6,443,345 | B1 | * 9/2002 | Bloemer et al. | ............ 224/519 |
| 6,755,332 | B2 | 6/2004 | Crane | |
| 6,827,244 | B1 | 12/2004 | Stapleton | |
| 7,261,229 | B1 | * 8/2007 | Allen et al. | ............ 224/503 |
| 2002/0014504 | A1 | 2/2002 | Hetu | |

FOREIGN PATENT DOCUMENTS

| | | |
|---|---|---|
| DE | 004122823 A1 | 1/1993 |
| DE | 019535918 A1 | 2/1996 |

* cited by examiner

*Primary Examiner*—Nathan J Newhouse
*Assistant Examiner*—Jack H Morgan, Jr.
(74) *Attorney, Agent, or Firm*—Michael A. Blake

(57) ABSTRACT

A bicycle carrier apparatus comprising: a first member configured to attach to an automobile trailer hitch; a first hinged element coupled to the first member; a second member coupled to the first hinged element and to a second hinged element; a bicycle attaching member coupled to the second hinged element; and where the bicycle carrier apparatus is configured move from a ground position to a traveling position, and from a traveling position to a ground position, by pivoting the second member and the bicycle attaching member about the first hinged element and the second hinged element. A bicycle carrier system comprising: an automobile with a rear; a first member attached to the rear of the automobile; a first hinged element coupled to the first member; a second member coupled to the first hinged element and to a second hinged element; a bicycle attaching member coupled to the second hinged element; and where the bicycle carrier apparatus is configured move from a ground position to a traveling position, and from a traveling position to a ground position, by pivoting the second member and the bicycle attaching member about the first hinged element and the second hinged element.

7 Claims, 6 Drawing Sheets

BICYCLE CARRIER APPARATUS FOR AUTOMOBILE

TECHNICAL FIELD

The invention relates to a load carrier for automobile vehicles, and more particularly to a load carrier provided with pivotable members to make the loading/unloading operations easier.

BACKGROUND

Load carriers for vehicles are well known. Traditionally, a load carrier comprises a surface adapted to receive a load, and means to mount the device on top of a vehicle. The user who wants to install a load or remove a load, simply lifts the load up, and places the load on the carrier, or lifts the load from the carrier and places it on the ground. This operation may be easy for light objects, if the user is healthy and/or the vehicle is small. But if the load is heavy or bulky, or the user is unhealthy, aged, small, or infirm, or if the vehicle top is too high, this operation may become difficult or even hazardous.

Extendable auto racks are also known. However, such known auto racks have some limitations, such as when used with a minivan or station wagon type vehicle or the like provided with a rear door opening upwardly; the length of the mounting frame or rails is limited at the rear of the vehicle in order not to interfere with the opening of the rear door. With short length rails, the carrying frame may hit the back of the vehicle when pivoted downwardly. This may cause damages to the vehicle body or to the rear window.

Considering the increasing number of high vehicle such as 4×4 vehicles, SUVs and minivans, there is a need for an improved load carrier that is easier and safer to use.

SUMMARY

The disclosed apparatus relates to a bicycle carrier apparatus comprising: a first member configured to attach to an automobile trailer hitch; a first hinged element coupled to the first member; a second member coupled to the first hinged element and to a second hinged element; a bicycle attaching member coupled to the second hinged element; and where the bicycle carrier apparatus is configured move from a ground position to a traveling position, and from a traveling position to a ground position, by pivoting the second member and the bicycle attaching member about the first hinged element and the second hinged element.

The disclosed system relates to a bicycle carrier system comprising: an automobile with a rear; a first member attached to the rear of the automobile; a first hinged element coupled to the first member; a second member coupled to the first hinged element and to a second hinged element; a bicycle attaching member coupled to the second hinged element; and where the bicycle carrier apparatus is configured move from a ground position to a traveling position, and from a traveling position to a ground position, by pivoting the second member and the bicycle attaching member about the first hinged element and the second hinged element.

The disclosed apparatus also relates to a bicycle carrier apparatus comprising: a first member configured to attach to an automobile trailer hitch; a first hinged element coupled to the first member; a second member coupled to the first hinged element and to a second hinged element; a cross member coupled to the second hinged element; a plurality of bicycle attaching members coupled to the cross member; and where the bicycle carrier apparatus is configured move from a ground position to a traveling position, and from a traveling position to a ground position, by pivoting the second member and the bicycle attaching members about the first hinged element and the second hinged element.

BRIEF DESCRIPTION OF THE DRAWINGS

The present disclosure will be better understood by those skilled in the pertinent art by referencing the accompanying drawings, where like elements are numbered alike in the several figures, in which.

DETAILED DESCRIPTION

Figure 1:
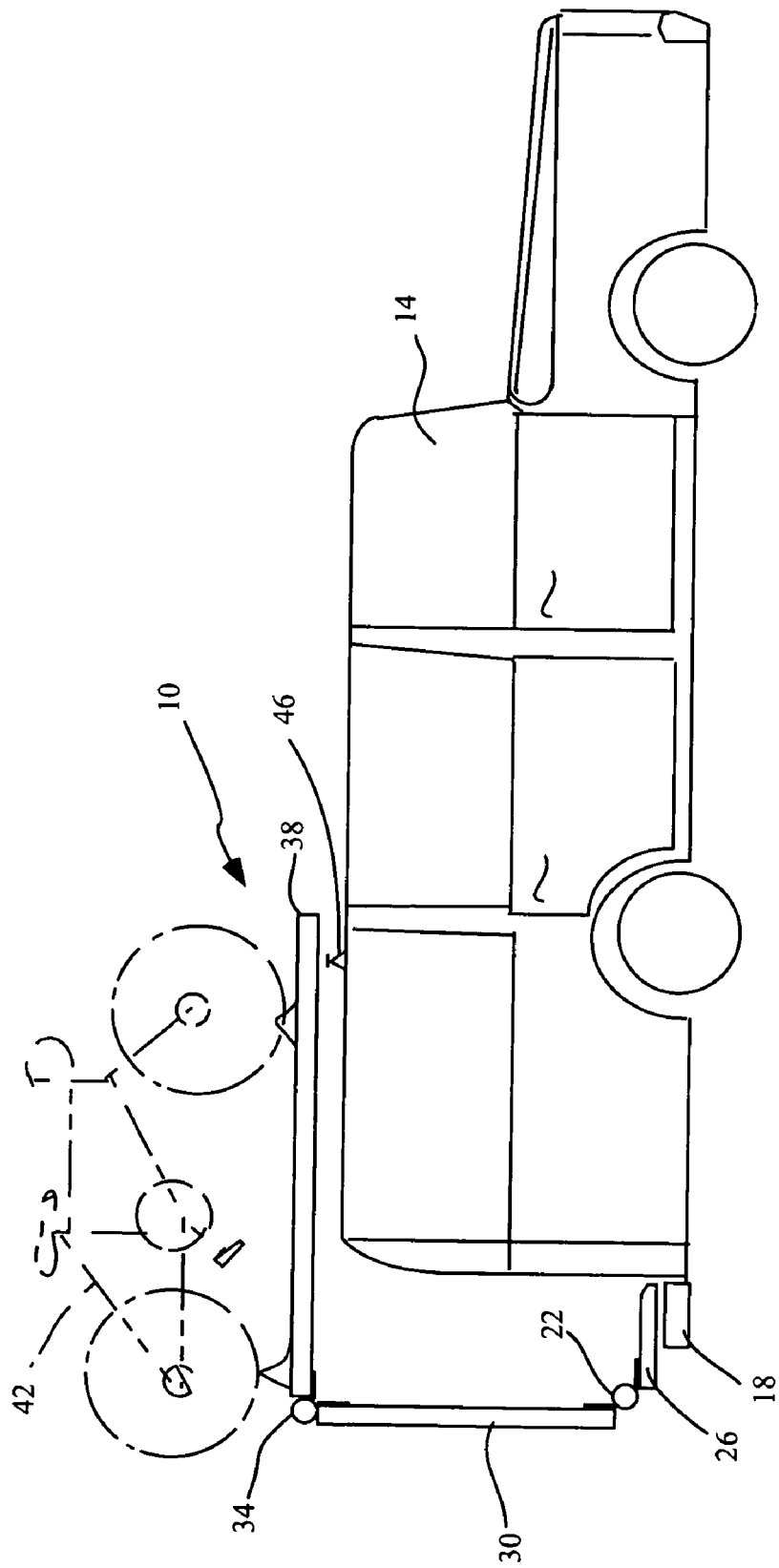
FIG. 1 is a side view of the disclosed bicycle carrier apparatus installed on an automobile.

FIG. 1 shows an embodiment of disclosed bicycle carrier apparatus 10 installed on an automobile 14. A first member 26 is coupled to a trailer hitch 18 already installed on the automobile. A first hinged element 22 connects the first member 26 to a second member 30. A second hinged element 34 connects a bicycle attaching member 38 to the second member 30. A bicycle 42 is removeably attached to the bicycle attaching member 38 in any number of known bicycle attachment means. A holder 46 may be installed on the roof of the automobile 14. The bicycle attaching member 38 may removeably attach to the holder 46. FIG. 1 shows the apparatus 10 with the bicycle 42 attached to the apparatus 10, and ready for the automobile 14 to transport the bicycle 42, in a traveling position. Hinged elements 22, 34 may comprise a torsional spring, which provides for easier manipulation of the apparatus, with and without a bicycle located on the bicycle attaching member 38. Additionally, pneumatic cylinders may be coupled to the first member 26 and second member 30 to provide assistance in manipulating the members 26, 30 about the first hinged element 22. Similarly, pneumatic cylinders may be coupled to the second member 30 and the bicycle attaching member 38 to provide assistance in manipulating the members 30, 38 about the second hinged element 34.

Figure 2:
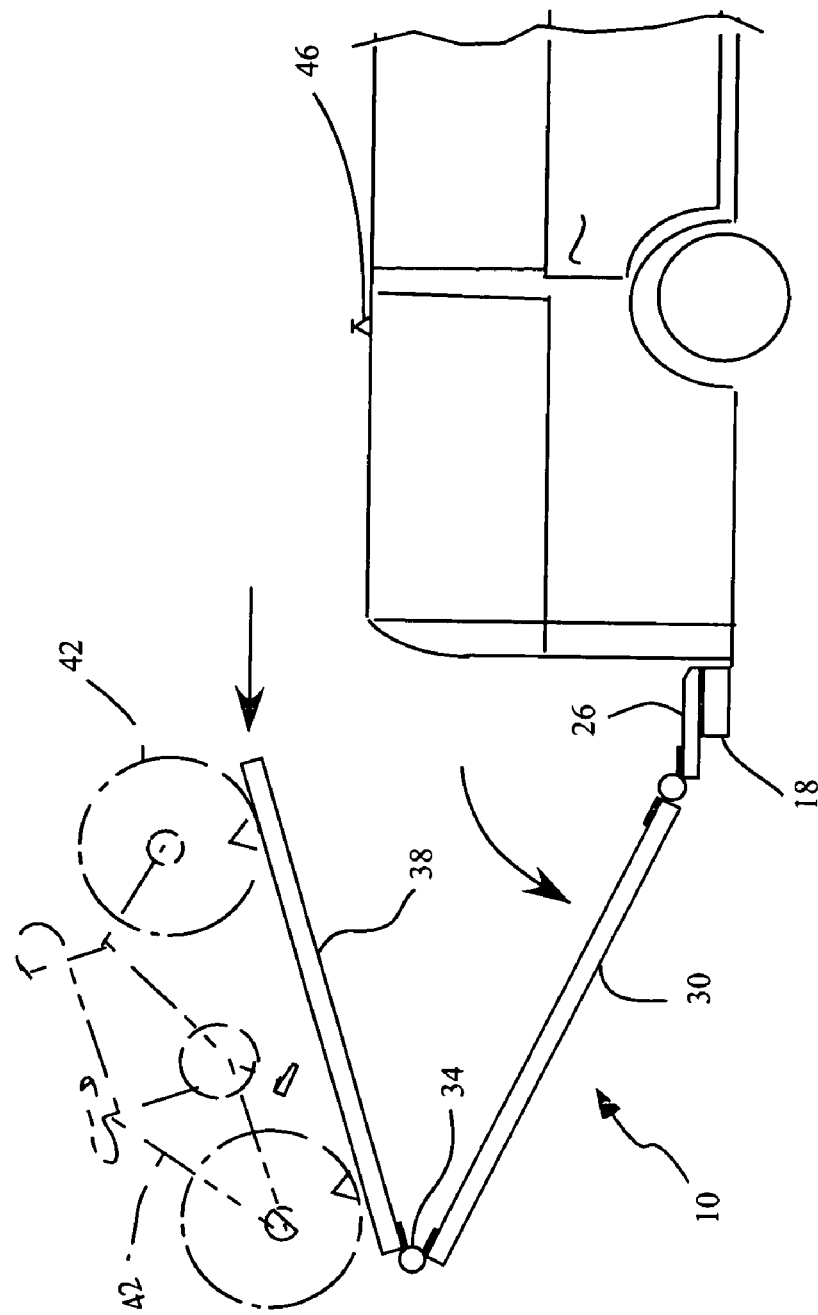
FIG. 2 is the disclosed bicycle carrier apparatus of FIG. 1 in a midpoint position.

FIG. 2 shows the apparatus 10 at a midpoint position in removing the bicycle 42 from the apparatus 10. The bicycle attaching member 38 has been detached from the holder 46 and moved to the left such that the second member 30 has been rotated left about the hinged element 22.

Figure 3:
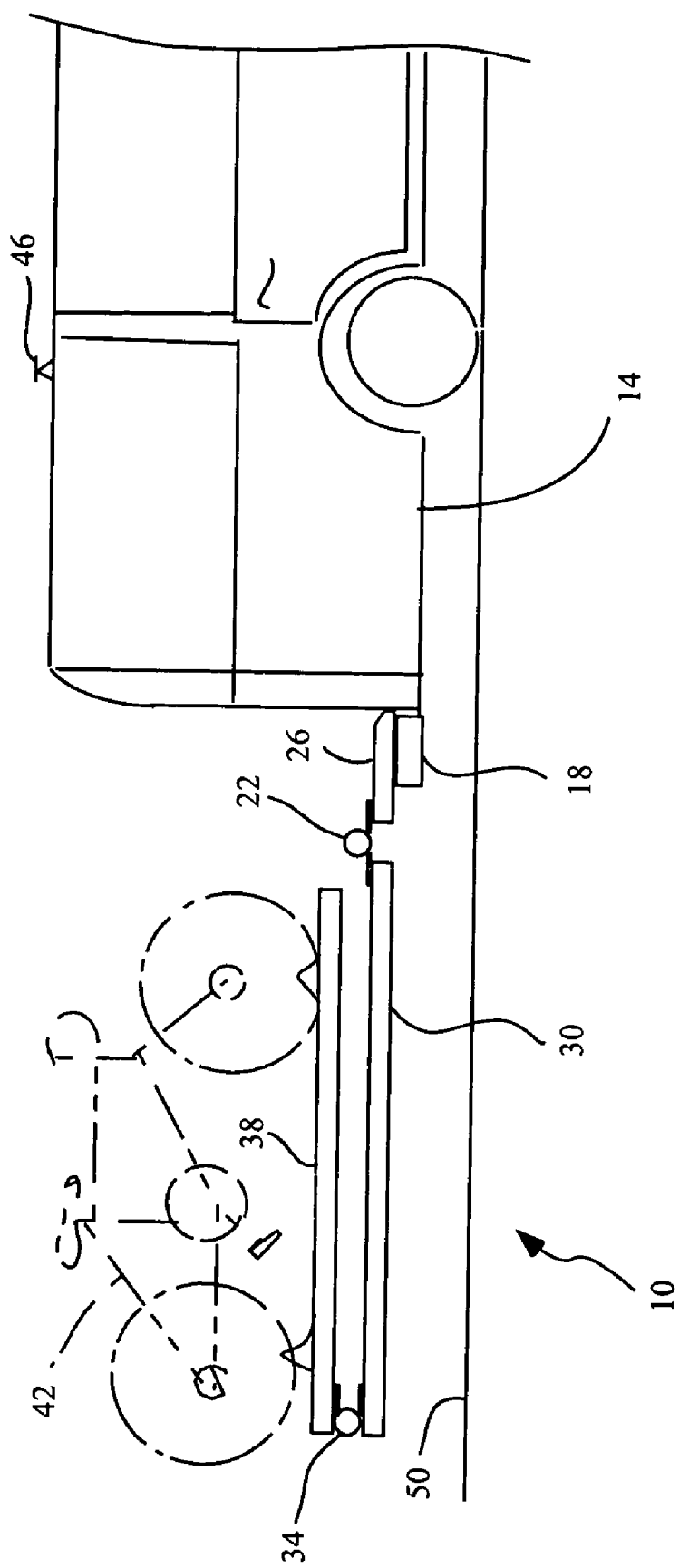
FIG. 3 is the disclosed bicycle carrier apparatus of FIG. 1 in a ground position.

FIG. 3 shows the apparatus 10 in a ground position. The second and bicycle attaching members 30, 38 are generally parallel to each other, and the second member 30 and first member 26 are generally collinear with respect to each other, thereby positioning the bicycle 42 and bicycle attaching member 38 close to ground level 50. With the apparatus 10 in this ground position, the bicycle can be easily removed from the apparatus 10, and/or placed on the apparatus 10. Once the bicycle 42 is removed from the apparatus 10, the apparatus can be disconnected from the trailer hitch 18. Once disconnected, the apparatus may be stored inside the vehicle, thereby allowing access to the rear gate, or hatch of the vehicle. Of course, the apparatus 10 can be placed back in the traveling position shown in FIG. 1, without the bicycle 42 attached to the apparatus 10.

The hinged element 22 may be configured to stop rotation when the first member 26 and second member 30 are generally collinear. The first, second and bicycle attaching members 26, 30, 38 may be made from the following non-limiting list of materials: aluminum alloys, steel, stainless steel, high strength plastic, and carbon composite. The holder 46 may also be made from the following non-limiting list of materials: aluminum alloys, steel, stainless steel, high strength plastic, and carbon composite. The holder 46 may be coupled to the automobile 14 roof via screws, adhesive, bolts, clips and Velcro. The apparatus may be configured to fit on various types of automobiles, such as 4×4's, SUVs, sedans, compacts, subcompacts, and other automobile types, by varying the lengths of the first, second and bicycle attaching members 26, 30, 38. Additionally, the bicycle carrier apparatus may also be used with other cargo, instead of just bicycles. Such other cargo, may include, but is not limited to: ski and ski equipment, rafts, canoes, etc.

Figure 4:
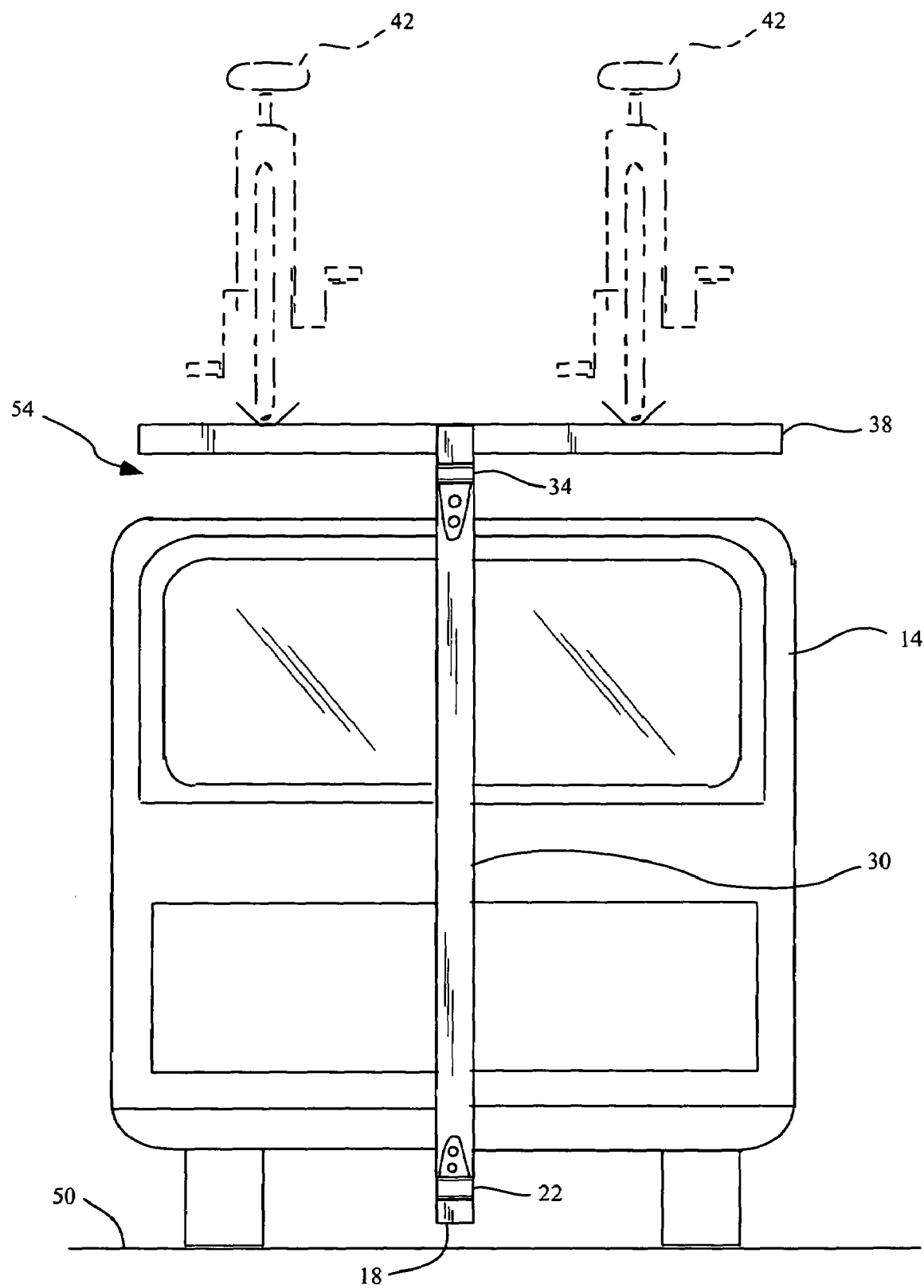
FIG. 4 is a rear view of another embodiment of the disclosed bicycle carrier apparatus.

FIG. 4 shows another embodiment of the disclosed bicycle carrier apparatus 54. In this rear view of the apparatus 54, the second member 30 is connected to the hinged element 34, which in turn is coupled to a cross member 37. In the embodiment of FIG. 4, cross member 37 is coupled to 2 bicycle attaching members 38, such that two bicycles 42, 42, may be attached to the apparatus 54.

Figure 7:
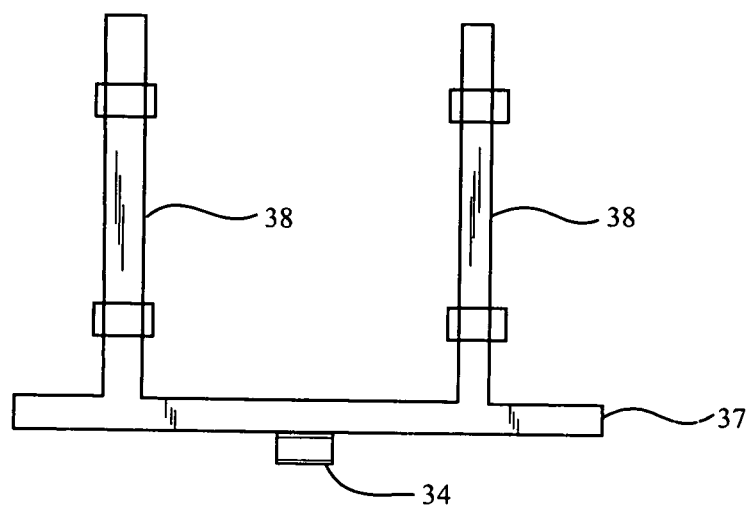
FIG. 7 is a top view of three bicycle attaching members.
Figure 6:
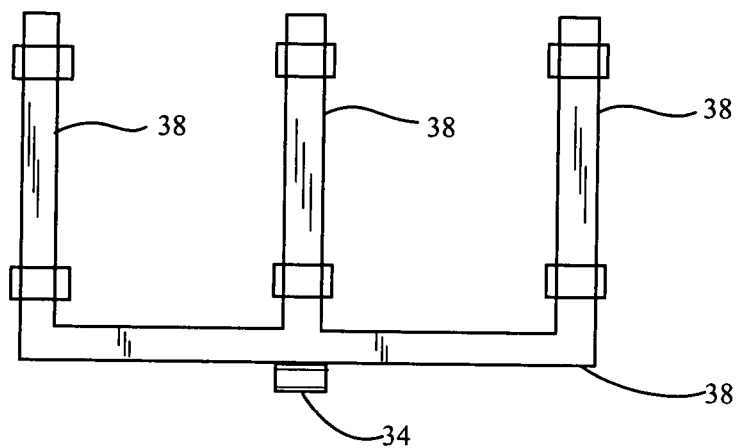
FIG. 6 is a top view of two bicycle attaching members.
Figure 5:
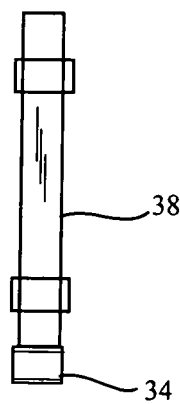
FIG. 5 is a top view of a bicycle attaching member.

FIG. 5 shows a top view of the bicycle attaching member 38 from FIG. 1. FIG. 6 shows a top view of the bicycle attaching members 38 and cross member 37 from FIG. 4. FIG. 7 shows a cross member 37, with 3 bicycle attaching members 38 coupled to it. In still other embodiments, 4 or more bicycle attaching members 38 may be attached to a cross member 37.

Figure 8:
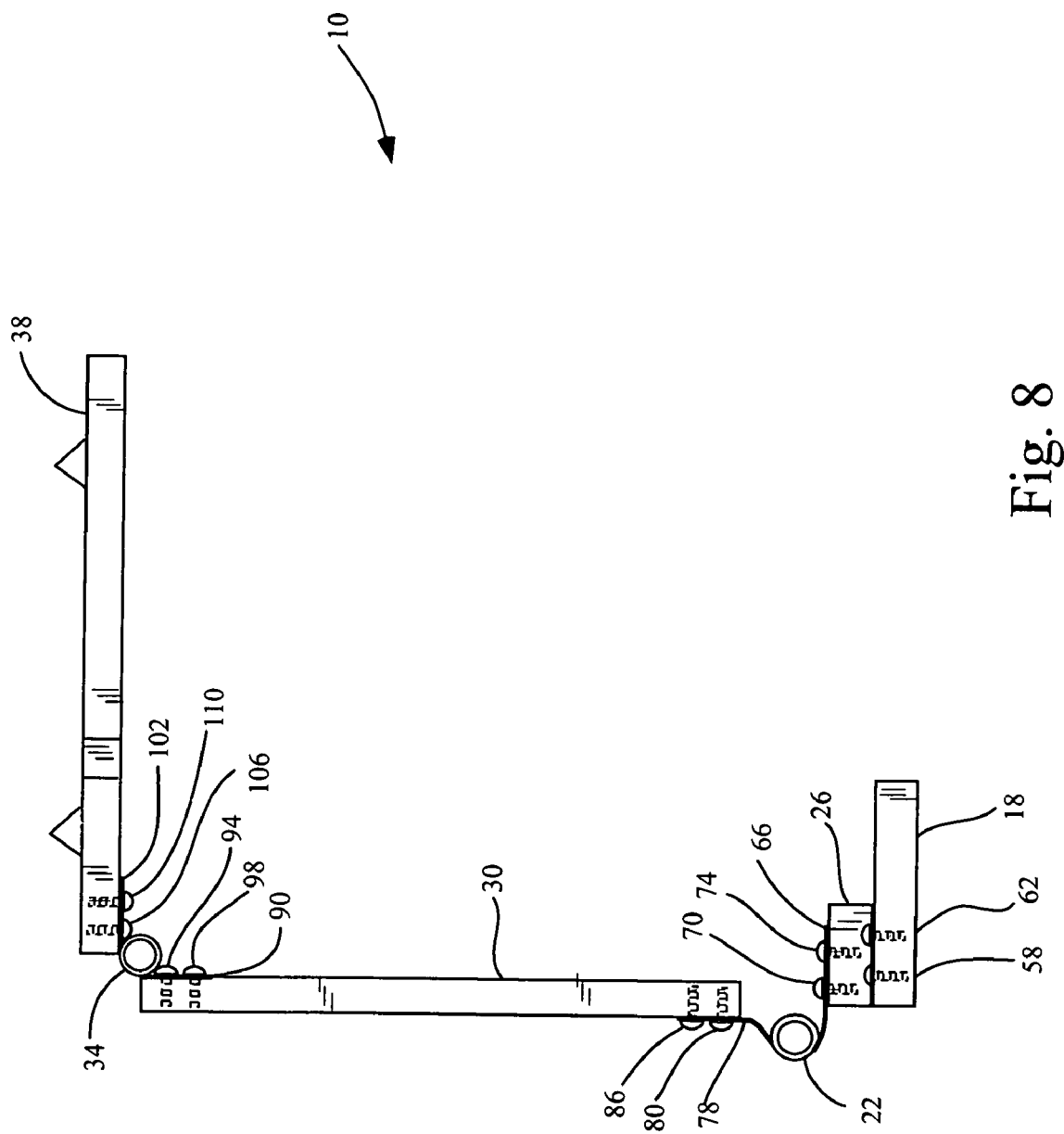
FIG. 8 is a side view of the bicycle carrier apparatus.

FIG. 8 shows a close up view of an embodiment of the apparatus 10. Trailer hitch 18 is coupled to the first member 26 via two bolts 58, 62. First member 26 is coupled to the first hinged element 22 via a first hinge plate 66 which is bolted to the first member 26 with bolts 70, 74. First hinged element 22 is coupled to the second member 30 via a second hinge plate 78 with bolts 82, 86. Similarly, second hinged element 34 is coupled to the second member via a third hinge plate 90, with bolts 94, 98. Lastly, the second hinged element 34 is coupled to the bicycle attaching member 38 via a fourth hinge plate 102 with bolts 106, 110. Of course, other means for attaching hinged elements to members 26, 30 and 38 that are known to those of ordinary skill in the art are encompassed by this patent application.

The disclosed bicycle carrier apparatus has many advantages. It allows one to attach one or more bicycles to an automobile without having to carry the bicycle from ground level to automobile roof level. Rather the apparatus can be pivoted so that it is near ground level, for easy attaching and removal of a bicycle to and from the apparatus. Then the apparatus can be pivoted and moved into place so that the one or more bicycles are located at the roof of the automobile. Therefore, the disclosed apparatus may allow many people, including, shorter people, older people, and handicapped people to easily attach and remove a bicycle to and from an automobile.

It should be noted that the terms "first", "second", and "third", and the like may be used herein to modify elements performing similar and/or analogous functions. These modifiers do not imply a spatial, sequential, or hierarchical order to the modified elements unless specifically stated.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims.

What is claimed is:

1. A bicycle carrier apparatus consisting of:
   a single first member configured to attach to an automobile trailer hitch;
   a first hinged element coupled to the first member;
   a single second member coupled to the first hinged element and to a second hinged element;
   a single bicycle attaching member coupled to the second hinged element;
   a holder attachable to a roof of the automobile and removeably coupled to the bicycle attaching member; and
   wherein the bicycle carrier apparatus is configured move from a ground position to a traveling position, and from a traveling position to a ground position, by pivoting the second member and the bicycle attaching member about the first hinged element and the second hinged element.

2. The bicycle carder apparatus of claim 1, wherein the apparatus is configurable to fit onto an automobile type selected from the group consisting of: 4×4's, SUVs, sedans, compacts, and subcompacts.

3. The bicycle carder apparatus of claim 1, wherein the first, second and bicycle attaching members may be made from a material selected from the group consisting of: aluminum alloy, steel, stainless steel, high strength plastic, and carbon composite.

4. The bicycle carder apparatus of claim 1, wherein the first hinge element is configured to stop rotating when the first member and second member are generally collinear with respect to each other.

5. A bicycle carrier system consisting of:
   an automobile with a rear;
   a single first member attached to the rear of the automobile;
   a first hinged element coupled to the first member;
   a single second member coupled to the first hinged element and to a second hinged element;
   a single attaching member coupled to the second hinged element;
   a holder attachable to a roof of the automobile and removeably coupled to the bicycle attaching member;
   wherein the bicycle carrier apparatus is configured move from a ground position to a traveling position, and from a traveling position to a ground position, by pivoting the second member and the bicycle attaching member about the first hinged element and the second hinged element.

6. A bicycle carrier apparatus consisting of:
   a single first member configured to attach to an automobile trailer hitch;
   a first hinged element coupled to the first member;
   a single second member coupled to the first hinged element and to a second hinged element;

a cross member coupled to the second hinged element;

a plurality of bicycle attaching members coupled to the cross member;

a holder attachable to a roof of the automobile and removeably coupled to the bicycle attaching member;

wherein the bicycle carrier apparatus is configured move from a ground position to a traveling position, and from a traveling position to a ground position, by pivoting the second member and the bicycle attaching members about the first hinged element and the second hinged element.

7. The bicycle carrier apparatus of claim 6, wherein the apparatus is configured to carry a plurality of bicycles.

* * * * *